United States Patent [19]
Hecker

[11] 3,750,163
[45] July 31, 1973

[54] IFF-SYSTEM

[75] Inventor: Klaus J. Hecker, Riverside, Calif.

[73] Assignee: The United States of America as represented by the Secretary of the Navy, Washington, D.C.

[22] Filed: Jan. 23, 1962

[21] Appl. No.: 168,287

[52] U.S. Cl. .......................... 343/6.5 R, 343/6.8 R
[51] Int. Cl. .............................................. G01s 9/56
[58] Field of Search ....................... 325/32; 343/6.5, 343/6.8, 10, 11, 112.3

Primary Examiner—Malcolm F. Hubler
Attorney—G. Baxter Warner and J. M. St. Amand

EXEMPLARY CLAIM

6. An electronic identification system for determining whether a target is friend or foe comprising:
   a first radar means to be carried in an aircraft capable of transmitting to an interrogation center a coded signal representing the identification of the aircraft, and second radar means located at the interrogation center for analyzing this coded signal,
   b. pulse generating means in each of said first and second radar means,
   c. identical digital counter means, each connected to one of said pulse generating means,
   d. means for initially synchronizing the pulse generating means and digital counter means in said second radar means with the pulse generating means and digital counter means in said first radar means, such that the pulse generating means in said second radar means will not differ substantially from the pulse generating means in said first radar means and the digital counter means in each of said first and second radar means will indicate the same number,
   e. code computers, each connected to one of said digital counter means, the number from said digital counter means in each of said first and second radar means being fed to respective code computers each of which perform a sequence of identical mathematical operations and have identical outputs which are a sequence of random code numbers, the output of the digital counter means and the code computers changing at a desired rate,
   f. adder means and code generating means connected to the code computer in the first radar means, the output of said code computer in said first radar means being fed to said adder means where an identification number is added thereto, the resultant number being converted into a code signal by said code generating means, and means for transmitting said code signal to said second radar means,
   g. means in said second radar means for receiving the code signal transmitted from said first radar means,
   h. decoder means in said second radar means for restoring the received code signal into its original resultant number and means for subtracting the output of the code computer in the second radar means therefrom, whereby an aircraft carrying said first radar means will be identified by its identification number.

7 Claims, 2 Drawing Figures

IFF-SYSTEM

The invention herein described may be manufactured and used by or for the Government of the United States of America for governmental purposes without the payment of any royalties thereon or therefor.

A radar system will measure the position of any object within its operation limits. In order to discriminate between friend or foe, so-called IFF-Systems (interrogation-friend or foe) are employed. A specific code is assigned to each of the friendly aircrafts, which is transmitted by the friendly aircraft and received by the radar. Upon interrogation the coded signal is transmitted to the interrogator which is decoded to determine if the sender is friend or foe. Although the more complicated IFF-Systems are fairly secure, the possibility exists that the code can be duplicated by an enemy aircraft.

The present invention is for an IFF-System which cannot be duplicated by enemy aircraft and therefore is superior to the known systems. This invention makes use of low frequency pulse generators and digital counters in both the friendly aircraft and at the interrogation center. A transmitted signal sent upon interrogation represents in coded form the digital count accumulated in the digital counter of the craft. The pulse generators and the digital counters in both the aircraft and the radar equipment at the interrogation center are synchronized, such that a transmitted signal when decoded will compare in digital form with the accumulation in the counter at the interrogation center and thus identify the craft as friendly.

It is an object of the invention therefore to provide a novel IFF-System.

It is another object of the invention to provide an IFF-System which cannot be duplicated by enemy aircraft.

It is a further object of the invention to provide an IFF-System using low frequency pulse generators and digital counters to prevent duplication of coded signals by enemy aircraft.

Other objects and many of the attendant advantages of this invention will become readily appreciated as the same becomes better understood by reference to the following detailed description when considered in connection with the accompanying drawings wherein.

Referring now to the drawings like numerals refer to like parts in each of the figures.

Figure 1:
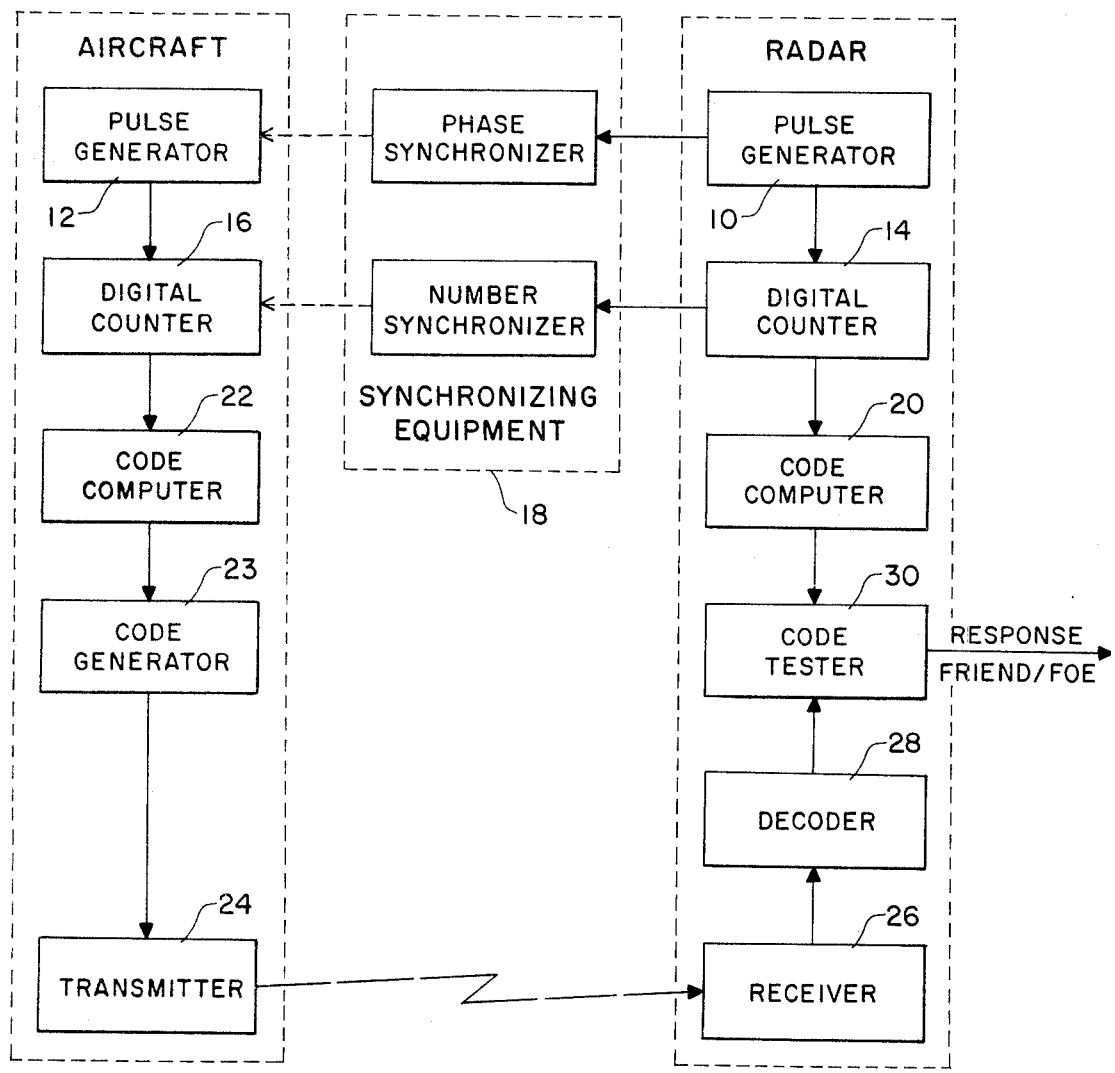
FIG. 1 is a block diagram of one embodiment of the invention.

The block diagram of the system shown in FIG. 1 employs low frequency genrators 10 and 12 in the radar and aircraft respectively. Pulse generators 10 and 12 are connected to digital counters 14 and 16 respectively, for example, of the type described in the text "Automatic Digital Computers" by M. V. Wilkes, pages 230-232, Methuen & Co. Ltd. London, 1956. The equipment in the aircraft is synchronized with the radar IFF equipment by means of synchronizing equipment 18 before the aircraft takes off. Typical synchronizing equipment can simply be comprised of a phase synchronizer and a number synchronizer, as shown within block 18 of FIGS. 1 and 2, using well known circuits and techniques. For example: The phase synchronizer may merely consist of a simple pulse amplifier circuit which amplifies a pulse from pulse generator 10 and feeds the pulse to pulse generator 12 to trigger pulse generator 12. Similarly, the number synchronizer may merely consist of a plurality of simple D.C. amplifiers, one for each stage of digital counter 14 which amplify the output voltages of counter 14 and feed them to counter 16 whereby corresponding stages of counter 16 will be forced to the same condition as the stages in counter 14. Assuming for the pulse generators 10 and 12 a frequency stability of 1:1,000,000 (which can be obtained easily by well known techniques) and a pulse repetition frequency of 1 pulse per second, pulse generator 12 in the aircraft will differ from pulse generator 10 in the radar by not more than one-tenth of a cycle after an elapsed time of 100,000 seconds (approximately 28 hours). Consequently, both the digital counters 14 and 16 in the radar and the aircraft will indicate the same number. This number is fed into code computers 20 and 22 for example, a general purpose digital computer, such as the Packard Bell PB 250 digital computer, programmed to perform perform a sequence of mathematical operations such as additions, multiplications and also some "crazy" operations such as interchanging digits, interchanging numbers and discarding digits, or a special purpose digital computer for performing these functions, built using techniques described in the aforementioned text "Automatic Digital Computers". The output of code computer 22 is a sequence of randomly changing numbers. These numbers are converted by code generator 23 (for example, a simple well known basic pulse or frequency modulator) to a pulse code (and/or a frequency code) and are transmitted from the aircraft by transmitter 24 to the radar receiver 26. In a decoder 28 in (for example, a standard type demodulator used in pulse modulation for frequency modulation systems) the radar the code numbers are restored and are compared by code tester 30 (for example, such as described in the article "Digital Matchers" by Richard A. Leslie and Ferdon Crawford, published in Electro-Technology, Pages 113-116, Nov. 1961) with the output of the code computer 20 of the radar. If the code numbers are equal, the aircraft is identified to be a friendly one.

An alternate method for pulse generation uses a pulse generator that produces higher pulse repetition frequency connected to the digital counter. The output of the digital counter then will show the desired low pulse repetition frequency.

Figure 2:
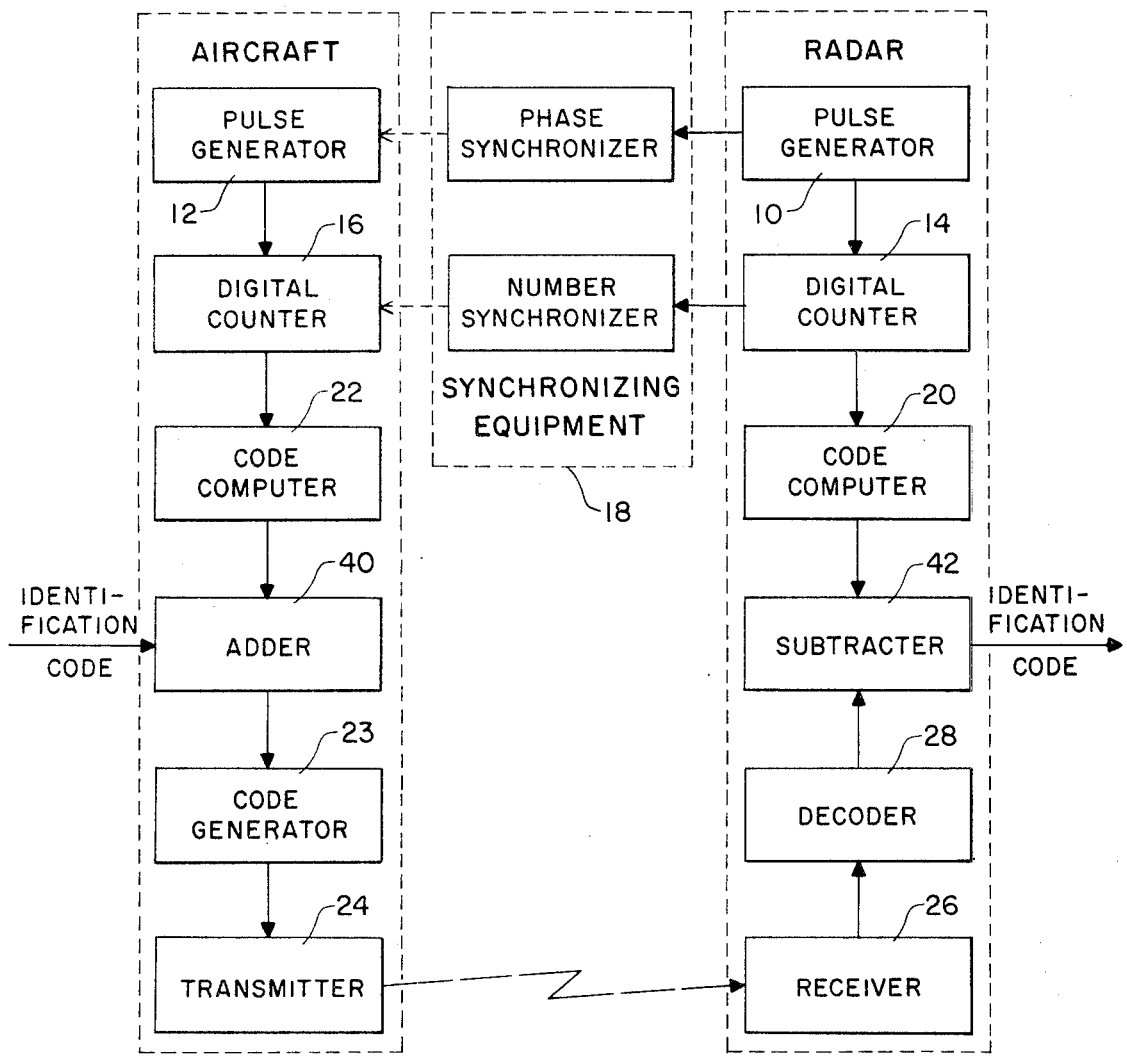
FIG. 2 is a block diagram similar to FIG. 1 of a more advanced system.

In a more advanced system of the invention as shown in FIG. 2 a computed code number is added to the identification number of the aircraft by means of an adder 40. Adder 40, for example. may consist of circuits of the type described on pages 35 and 230 of the aforementioned text "Automatic Digital Computers."- The sum is then fed into the code generator 23, transmitted by transmitter 24, received by radar receiver 26 and decoded by decoder 28 in the radar. The output of code computer 20 in the radar is then subtracted by subtractor 42 from the received code in the result identifies the aircraft by its identification number. Subtracter 42, for example, may consist of circuits of the type also described in the text "Automatic Digital Computers," on pages 226-227.

The foregoing devices provide relatively simple methods for generating a complex pseudo random code which may be identified by friendly forces but could not be duplicated by the enemy.

Obviously many modifications and variations of the present invention are possible in the light of the above teachings. It is therefore to be understood that within the scope of the appended claims the invention may be practiced otherwise than as specifically described.

What is claimed is:

1. An electronic identification system for determining whether a target is friend or foe comprising:
   a. a first radar means to be carried in an aircraft capable of transmitting to an interrogation center a coded signal representing the identification of the aircraft, and second radar means located at the interrogation center for analyzing this coded signal,
   b. low frequency pulse generating means in each of said first and second radar means,
   c. identical digital counter means, each connected to one of said pulse generating means,
   d. means for initially synchronizing the pulse generating means and digital counter means in said second radar means with the pulse generating means and digital counter means in said first radar means, such that the pulse generating means in said second radar means will not differ from the pulse generating means in the station to be identified by more than one-tenth of a cycle after an elapsed time of 100,000 seconds and the digital counter means in each of said first and second radar means will indicate the same number,
   e. code computers, each connected to one of said digital counter means, the number from said digital counter means in each of said first and second radar means being fed to respective code computers each of which perform a sequence of identical mathematical operations and have identical outputs which are a sequence of random code numbers, the output of the digital counter means and the code computers changing at a desired rate,
   f. a code generating means connected to the code computer in said first radar means, the output of the code computer in said first radar means being converted into a pulse code by said code generating means, and means for transmitting said pulse code to said second radar means,
   g. means in said second radar means for receiving the pulse code transmitted from said first radar means,
   h. decoder means in said second radar means for restoring the received pulse code into its original code numbers and means for comparing these code numbers with the code number from the output of the code computer in the second radar means, whereby when both code numbers are equal aircraft carrying said first radar means is identified as friendly.

2. An electronic identification system for determining whether a target is friend or foe comprising:
   a. a first radar means to be carried in an aircraft capable of transmitting to an interrogation center a coded signal representing the identification of the aircraft, and second radar means located at the interrogation center for analyzing this coded signal,
   b. pulse generating means in each of said first and second radar means,
   c. identical digital counter means, each connected to one of said pulse generating means,
   d. means for initially synchronizing the pulse generating means and digital counter means in said second radar means with the pulse generating means and digital counter means in said first radar means, such that the pulse generating means in said second radar means will not differ substantially from the pulse generating means in said first radar means and the digital counter means in each of said first and second radar means will indicate the same number,
   e. code computers, each connected to one of said digital counter means, the number from digital counter means in each of said first and second radar means being fed to respective code computers each of which perform a sequence of identical mathemathical operations and have identical outputs which are a sequence of random code numbers, the output of the digital counter means and the code computers changing at a desired rate,
   f. code generating means connected to the code computer in said first radar means, the output of said code computer in said first radar means; being converted into a code signal by said code generating means, and means for transmitting said code signal to said second radar means,
   g. means in said second radar means for receiving the code signal transmitted from said first radar means,
   h. decoder means in said second radar means for restoring the received code signal into its original code numbers and means for comparing these code numbers with the code number from the output of the code computer in the second radar means, whereby when both code numbers are equal the aircraft carrying said first radar means is identified as friendly.

3. A device as in claim 2 wherein said code signal is a pulse code.

4. A device as in claim 2 wherein said code signal is a frequency code.

5. A device as in claim 2 wherein said code signal is a combination of both pulse and frequency code.

6. An electronic identification system for determining whether a target is friend or foe comprising:
   a. a first radar means to be carried in an aircraft capable of transmitting to an interrogation center a coded signal representing the identification of the aircraft, and second radar means located at the interrogation center for analyzing this coded signal,
   b. pulse generating means in each of said first and second radar means,
   c. identical digital counter means, each connected to one of said pulse generating means,
   d. means for initially synchronizing the pulse generating means and digital counter means in said second radar means with the pulse generating means and digital counter means in said first radar means, such that the pulse generating means in said second radar means will not differ substantially from the pulse generating means in said first radar means and the digital counter means in each of said first and second radar means will indicate the same number,
   e. code computers, each connected to one of said digital counter means, the number from said digital counter means in each of said first and second radar means being fed to respective code computers each of which perform a sequence of identical mathematical operations and have identical outputs which are a sequence of random code numbers, the output of the digital counter means and the code computers changing at a desired rate, f. adder means and code generating means connected to the code computer in the first radar means, the output of said code computer in said first radar means being fed to said adder means where an identification number is added thereto, the resultant number being converted into a code signal by said code generating means, and means for transmitting said code signal to said second radar means, g. means in said second radar means for receiving the code signal transmitted from said first radar means, h. decoder means in said second radar means for restoring the received code signal into its original resultant number and means for subtracting the output of the code computer in the second radar means therefrom, whereby an aircraft carrying said first radar means will be identified by its identification number.

7. An electronic identification system for determining whether a target is friend or foe comprising:

a. at least one first radar means each to be carried in an aircraft and capable of transmitting to an interrogation center a coded signal representing the identification of the aircraft, and a second radar means located at the interrogation center for analyzing this coded signal, b. low frequency pulse generating means in each of said first and second radar means, c. identical digital counter means, each connected to one of said pulse generating means d. the pulse generating means and digital counter means in the second radar means being synchronized with that in said first radar means, e. code computers, each connected to one of said digital counter means, the number from said digital counter means in each of said first and second radar means being fed to respective code computers each of which perform a sequence of identical mathematical operations and have identical outputs which are a sequence of random code numbers, the output of the digital counter means and the code computers changing at a desired rate, f. code generating means connected to the code computer in said first radar means, the output of said code computer in said first radar means; being converted into a code signal by said code generating means, and means for transmitting said code signal to said second radar means, g. means in said second radar means for receiving the code signal transmitted from said first radar means, h. decoder means in said second radar means for restoring the received code signal into its original code numbers and means for comparing these code numbers with the code number from the output of the code computer in the second radar means, whereby when both code numbers are equal the aircraft carrying said first radar means is identified as friendly.

* * * * *